US008281747B1

(12) United States Patent
Few

(10) Patent No.: US 8,281,747 B1
(45) Date of Patent: Oct. 9, 2012

(54) ANIMAL CONTAINMENT APPARATUS

(76) Inventor: Johnny L. Few, Albuquerque, NM (US)

(*) Notice: Subject to any disclaimer, the term of this patent is extended or adjusted under 35 U.S.C. 154(b) by 0 days.

(21) Appl. No.: 12/978,737

(22) Filed: Dec. 27, 2010

(51) Int. Cl.
*A01K 29/00* (2006.01)

(52) U.S. Cl. ........................................... 119/719

(58) Field of Classification Search ............... 119/719, 119/712, 720, 721; 116/22 A
See application file for complete search history.

(56) References Cited

U.S. PATENT DOCUMENTS

| | | | |
|---|---|---|---|
| 5,061,918 A | 10/1991 | Hunter | |
| 6,016,100 A * | 1/2000 | Boyd et al. | 340/384.2 |
| 6,191,693 B1 * | 2/2001 | Sangsingkeow | 340/573.3 |
| 6,615,770 B2 | 9/2003 | Patterson et al. | |
| 7,259,718 B2 | 8/2007 | Patterson et al. | |
| 7,278,375 B2 * | 10/2007 | Ross et al. | 119/719 |
| 7,518,522 B2 * | 4/2009 | So | 340/573.3 |
| RE41,629 E * | 9/2010 | Bonge, Jr. | 340/573.3 |
| 7,918,190 B2 * | 4/2011 | Belcher et al. | 119/721 |
| 2001/0042522 A1 * | 11/2001 | Barry et al. | 119/721 |
| 2002/0189551 A1 * | 12/2002 | Patterson et al. | 119/719 |
| 2003/0066492 A1 * | 4/2003 | Fransen et al. | 119/524 |
| 2008/0168949 A1 * | 7/2008 | Belcher et al. | 119/721 |
| 2009/0031966 A1 * | 2/2009 | Kates | 119/719 |

* cited by examiner

Primary Examiner — Richard Price, Jr.

(57) ABSTRACT

The animal containment apparatus provides a stand alone apparatus that may be used singularly or in plurality. Each apparatus has an adjustable angle sensor that may be set to encompass any angle up to about 180 degrees. Each sensor senses incursion of an object, alive or otherwise, into its set range area. Animals, people, or even propelled objects are sensed. A key feature is that sensed objects do not have to wear any sort of device in cooperation with the apparatus. Sensation of such objects and life forms trigger each apparatus to emit a user recorded sound. The sound may be a command or any other chosen recording. Of significant advantage is that the recorder/sound interface provides for an animal's master to record commands in a voice and structure as recognized by the animal.

4 Claims, 6 Drawing Sheets

ANIMAL CONTAINMENT APPARATUS

BACKGROUND OF THE INVENTION

Animal containment is a long standing problem. A need also arises in attempting to negate the incursion of animals into an area, even unknown animals. Most previously existing devices for animal containment are devoted to discouraging a known animal from leaving a designated area. The most basic of such devices is a fence, followed by an electrified fence or wire. Most modern containment systems require an animal to wear some sort of device, such as a collar, that cooperates with sensing devices placed around a perimeter. Upon sensing the animal's incursion into an area, the collar may shock the animal, thereby discouraging escape. Further, other previously presented devices that use some form of electronic sensing require at least one other companion device in order to determine an animal's egress or even access.

The present apparatus does not require an animal to wear such a device, and may be used not only to help control an animal's defined area, but also used to discourage unknown animal invasion, as well as invasion by people, whether as a single apparatus or in combination with many apparatus.

FIELD OF THE INVENTION

The animal containment apparatus relates to animal containment devices and more especially to a containment apparatus that contains an animal with solar powered sensors used singularly or in plurality, without animal adornment.

SUMMARY OF THE INVENTION

The general purpose of the animal containment apparatus, described subsequently in greater detail, is to provide an animal containment apparatus which has many novel features that result in an improved animal containment apparatus which is not anticipated, rendered obvious, suggested, or even implied by prior art, either alone or in combination thereof.

To attain this, the animal containment apparatus uniquely provides a stand alone apparatus. The apparatus may be used singularly or in plurality. Each apparatus has an adjustable angle sensor that may be set to encompass any angle up to about 180 degrees. Each sensor senses incursion of an object, alive or otherwise, into its set range area.

Animals, people, or even propelled objects are sensed. A key feature is that sensed objects do not have to wear any sort of device in cooperation with the apparatus. Sensation of such objects and life forms trigger each apparatus to emit a user recorded sound. The sound may be a command or any other chosen recording. Of significant advantage is that the recorder/sound interface provides for an animal's master to record commands in a voice and structure as recognized by the animal. Not only can this be more effective, it reinforces an animal's behavior of the master's commands. Conversely, incursion by an unknown animal or person can also be met by a human voice, a deterrent well recognized. Each apparatus provides a tapered stake with fins that eases surface penetration, and negates apparatus rotation while assuring surface retention.

Thus has been broadly outlined the more important features of the improved animal containment apparatus so that the detailed description thereof that follows may be better understood and in order that the present contribution to the art may be better appreciated.

An object of the animal containment apparatus is to prevent egress and encroachment into a defined area.

Another object of the animal containment apparatus is to automatically sense incursion into the sensed area.

A further object of the animal containment apparatus is to negate the need for any cooperative devices.

An added object of the animal containment apparatus is to operate even as a single apparatus.

And, an object of the animal containment apparatus is to provide angle adjustment for sensor areas.

A further object of the animal containment apparatus is to be self powered.

Yet another object of the animal containment apparatus is to provide for self recording and playback of an animal master's voice.

Still another object of the animal containment apparatus is to provide for recording any desired sound.

These together with additional objects, features and advantages of the improved animal containment apparatus will be readily apparent to those of ordinary skill in the art upon reading the following detailed description of presently preferred, but nonetheless illustrative, embodiments of the improved animal containment apparatus when taken in conjunction with the accompanying drawings.

DETAILED DESCRIPTION OF THE DRAWINGS

With reference now to the drawings, and in particular FIGS. 1 through 6 thereof, the principles and concepts of the animal containment apparatus generally designated by the reference number 10 will be described.

Figure 1:
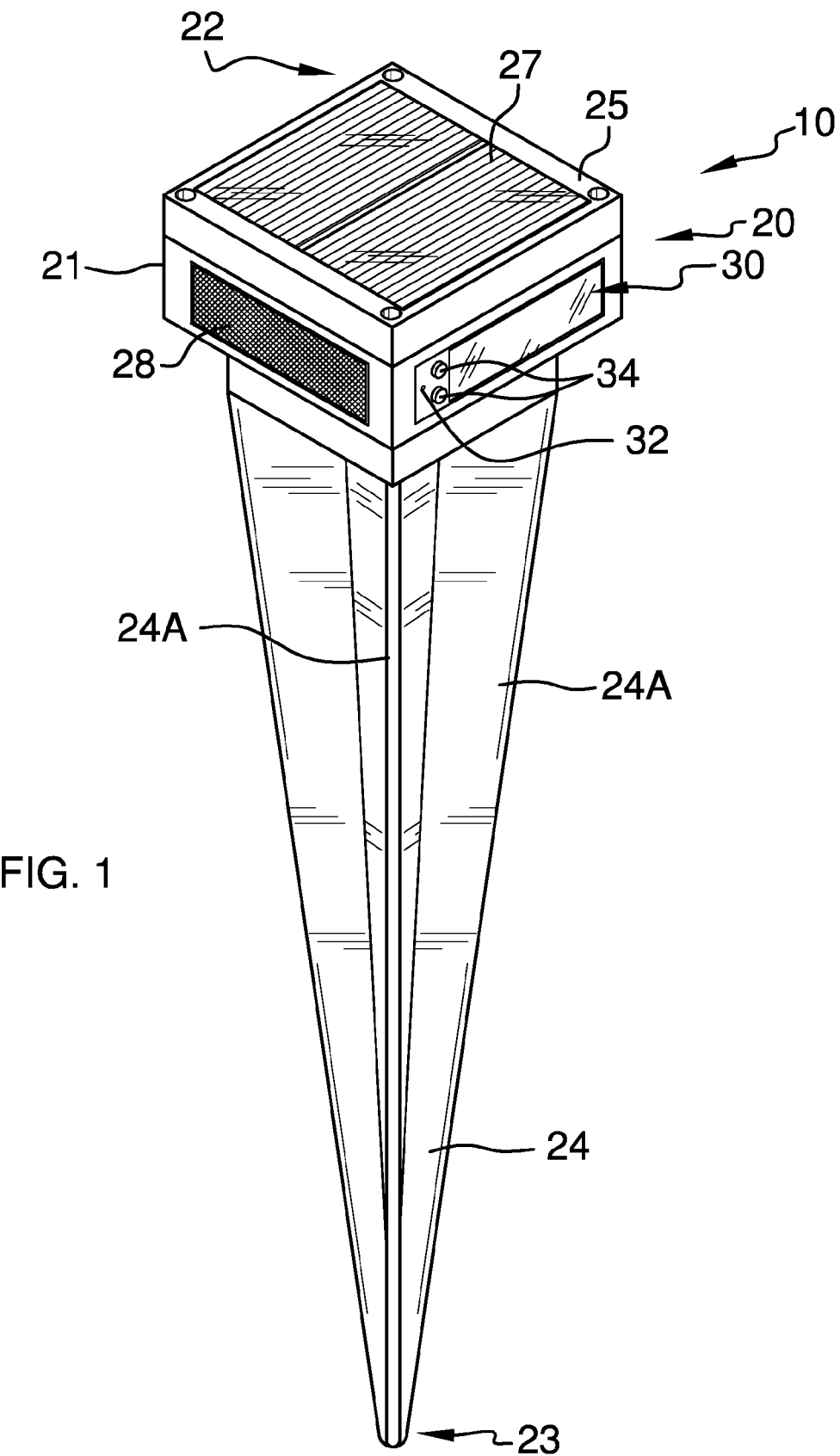
FIG. 1 is a perspective view.

Referring to FIG. 1, the apparatus 10 comprises at least one implant unit 20 having a top 22 spaced apart from a bottom 23. Any number of implant units 20 may be used. The tapered stake 24 with radially spaced apart fins 24A is extended downwardly to the bottom 23.

Figure 6:
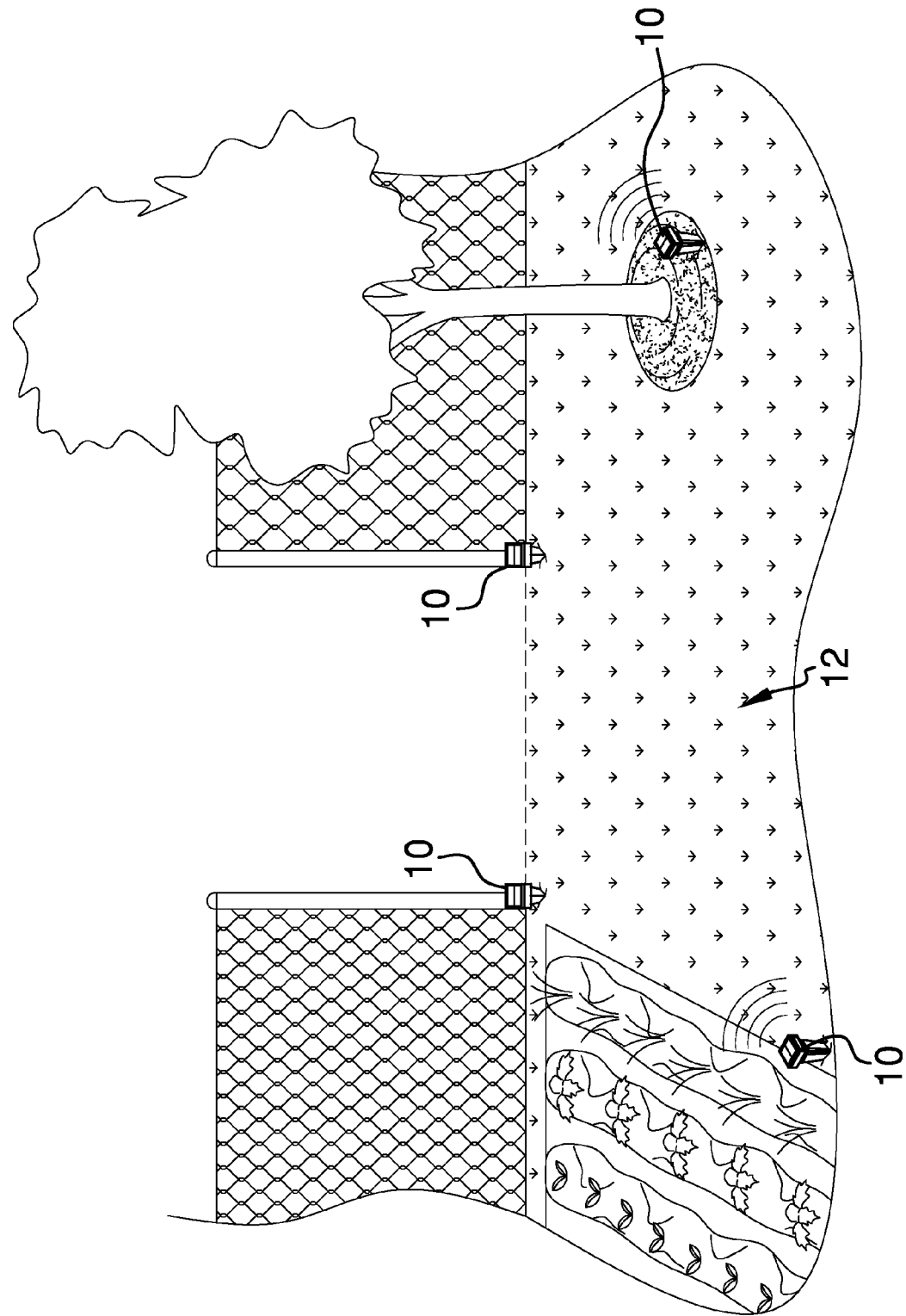
FIG. 6 is a perspective view of the apparatus in an exemplary installation.

Referring to FIG. 6, the stake 24 provides implantation into a given existing surface of a containment area 12.

Figure 2:
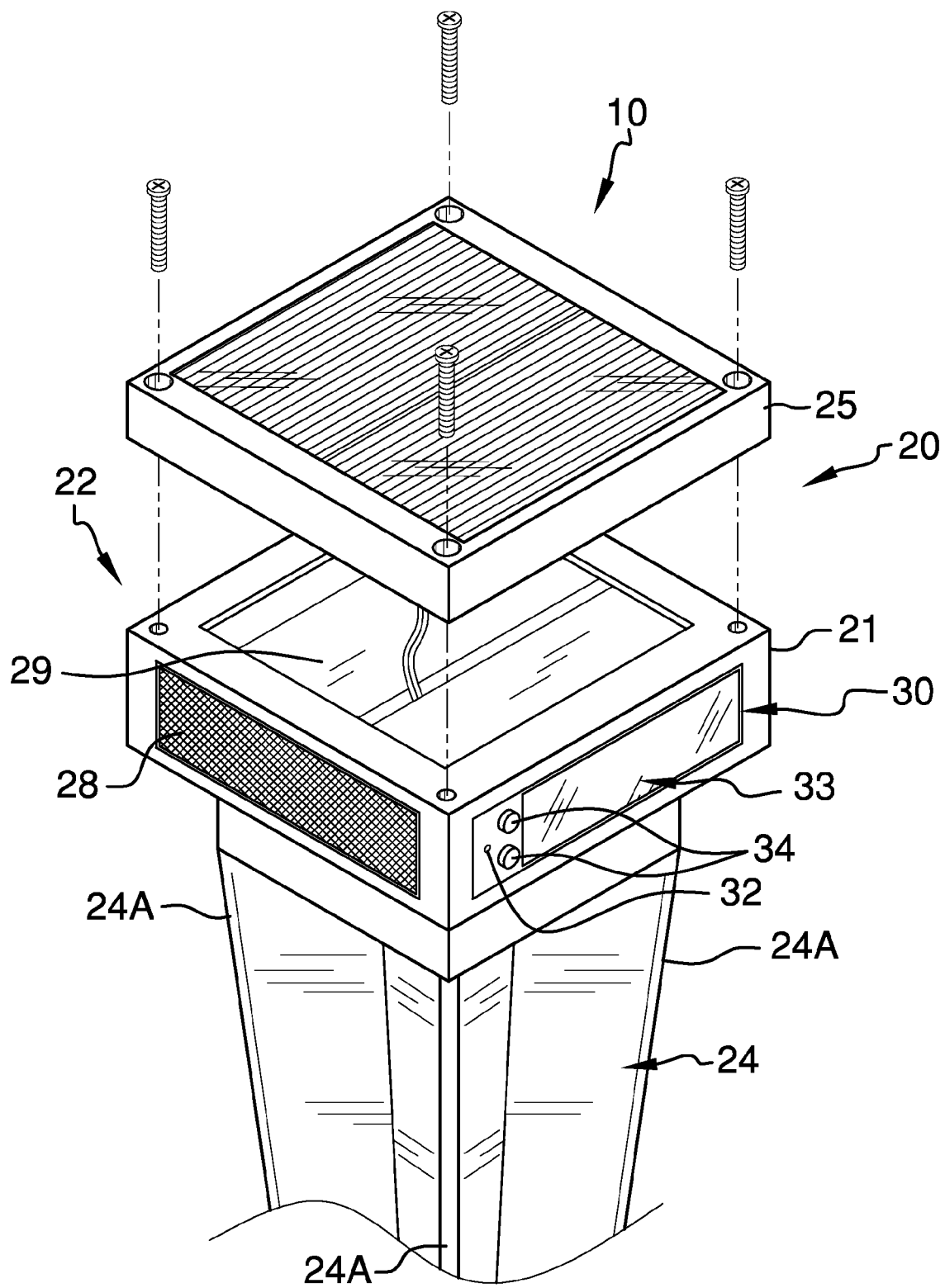
FIG. 2 is a perspective view, cap off.

Referring to FIG. 2, the case 21 is disposed atop the stake 24. The case 21 further comprises the removable cap 25 disposed atop the case 21. The solar cells 27 are disposed within the cap 25. The battery 29 is disposed within the case 21. The battery 29 is in communication with the solar cells 27. The speaker 28 is disposed within the case 21.

Figure 3:
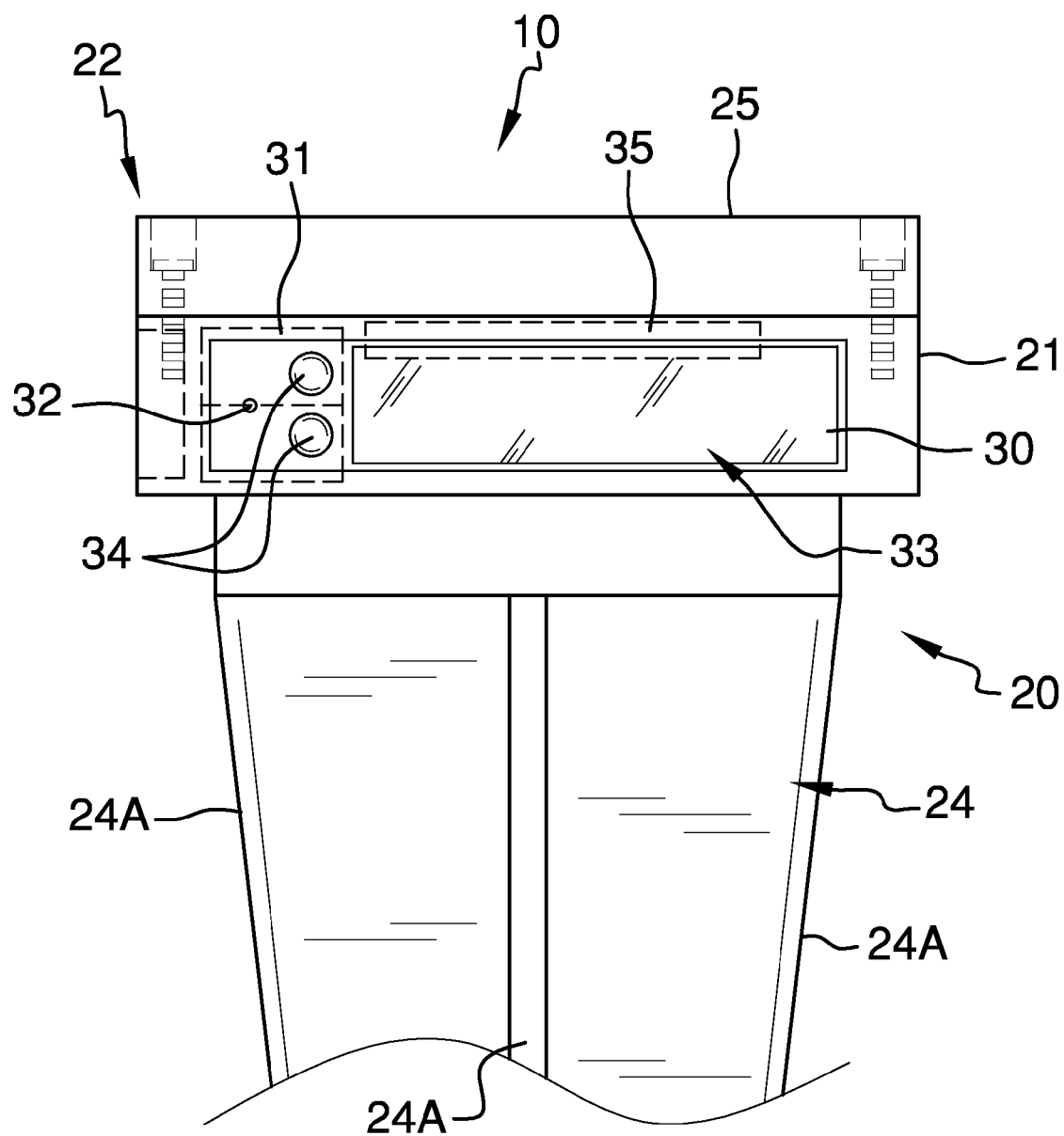
FIG. 3 is a lateral elevation view.
Figure 4:
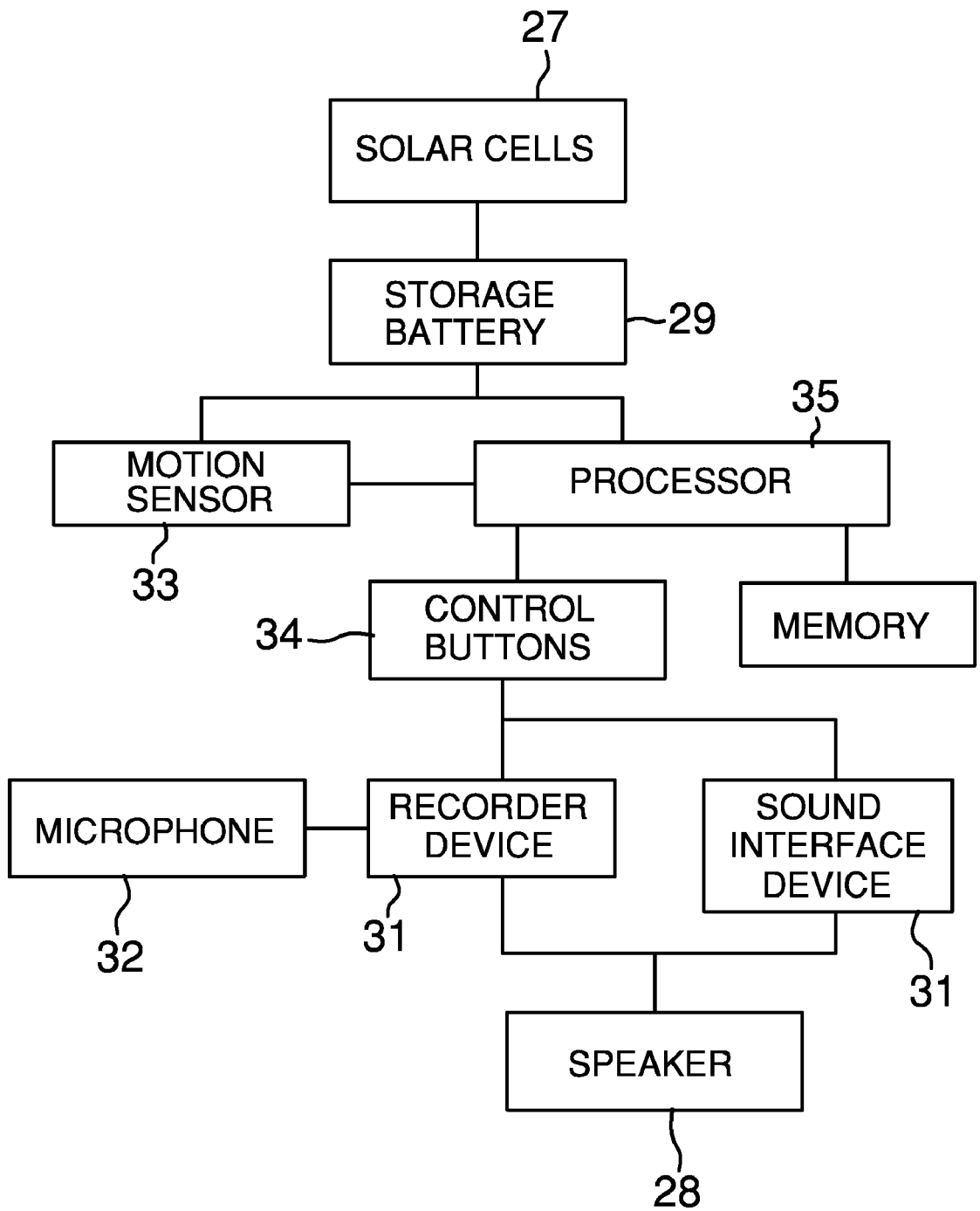
FIG. 4 is a schematic block diagram of components in communication.

Referring to FIG. 3, the sensor unit 30 is disposed within the case 21. The recorder/sound interface 31 is disposed within the sensor unit 30. The MIC 32 is disposed within the sensor unit 30. The adjustable angle sensor 33 is disposed within the sensor unit 30. The controls 34 are disposed within the sensor unit 30. All sensor unit 30 components are in communication. The processor with memory 35 is in communication with the battery 29, the speaker 28, and the sensor unit 30.

Figure 5:
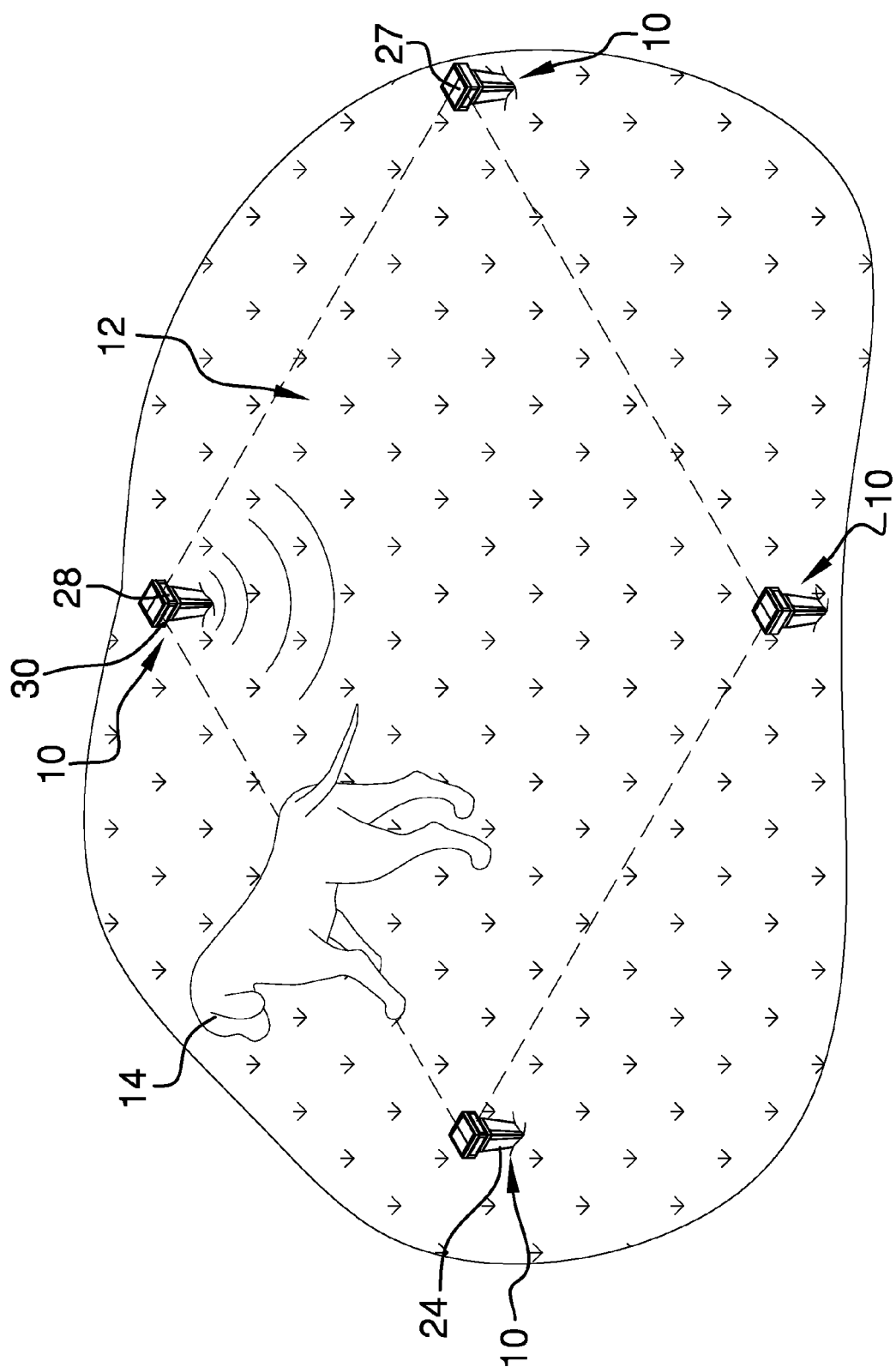
FIG. 5 is a perspective view of an animal confined by the apparatus.

Referring to FIG. 5, the animal 14 is discouraged from leaving the containment area 12 by the apparatus. The sensor units 30 of each apparatus 10 have been arranged in an approximate square with the adjustable angle sensors 33 each set by controls 34 to narrow angles directed toward the next apparatus 10. The animal has encroached upon the sensor 33 of one apparatus 10 and is therefore hearing a command from the speaker 28 of that apparatus 10.

Referring again to FIGS. 5 and 6, the apparatus 10 may be arranged as desired, with each apparatus 10 sensor 33 adjusted to define the desired containment area 12. One, two, three, four, or any given number of the apparatus 10 may be used.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the animal containment apparatus may be used.

What is claimed is:

1. An animal containment apparatus comprising, in combination:
    an at least one implant unit having a top spaced apart from a bottom;
    a stake selectively implanted into a given existing surface of a desired containment area;
    a case disposed atop the stake, the case further comprising:
        a removable cap disposed atop the case;
        at least one solar cell disposed within the cap;
        a battery disposed within the case, the battery in communication with the at least one solar cell;
        a speaker disposed within the case;
        a sensor unit disposed within the case, the sensor unit further comprising components in communication, the components comprising:
            a recorder/sound interface;
            a MIC disposed within the sensor unit;
            an adjustable angle sensor;
            controls;
        a processor with memory disposed within the case, the processor in communication with the battery, the speaker, and the sensor unit.

2. The apparatus according to claim 1 wherein the adjustable angle sensor is further adjustable to up to about 180 degrees.

3. An animal containment apparatus comprising, in combination:
    an at least one implant unit having a top spaced apart from a bottom;
    a tapered stake with radially spaced apart fins extended downwardly to the bottom, the stake selectively implanted into a given existing surface of a containment area;
    a case disposed atop the stake, the case further comprising:
        a removable cap disposed atop the case;
        at least one solar cell disposed within the cap;
        a battery disposed within the case, the battery in communication with the at least one solar cell;
        a speaker disposed within the case;
        a sensor unit disposed within the case, the sensor unit further comprising components in communication, the components comprising:
            a recorder/sound interface;
            a MIC disposed;
            an adjustable angle sensor;
            controls;
        a processor with memory disposed within the case, the processor in communication with the battery, the speaker, and the sensor unit.

4. The apparatus according to claim 3 wherein the adjustable angle sensor is further adjustable to up to about 180 degrees.

* * * * *